United States Patent
Yamashita et al.

(10) Patent No.: US 7,351,487 B2
(45) Date of Patent: Apr. 1, 2008

(54) FUEL CELL

(75) Inventors: Shoji Yamashita, Kokubu (JP); Shoji Kohsaka, Kokubu (JP)

(73) Assignee: Kyocera Corporation, Kyoto (JP)

( * ) Notice: Subject to any disclaimer, the term of this patent is extended or adjusted under 35 U.S.C. 154(b) by 451 days.

(21) Appl. No.: 10/424,889

(22) Filed: Apr. 28, 2003

(65) Prior Publication Data
US 2003/0224240 A1 Dec. 4, 2003

(30) Foreign Application Priority Data
May 29, 2002 (JP) .............................. 2002-156284
Aug. 28, 2002 (JP) .............................. 2002-249800

(51) Int. Cl.
*H01M 8/12* (2006.01)

(52) U.S. Cl. .......................................... 429/33; 429/45

(58) Field of Classification Search .............. 429/12–52
See application file for complete search history.

(56) References Cited

U.S. PATENT DOCUMENTS 3,961,987 A * 6/1976 Mund et al. ................... 429/44
4,894,297 A * 1/1990 Singh et al. ................... 429/31
5,391,440 A * 2/1995 Kuo et al. ...................... 429/27
6,887,361 B1 * 5/2005 Visco et al. ................. 204/491

FOREIGN PATENT DOCUMENTS

JP          07-029574          1/1995

* cited by examiner

*Primary Examiner*—Mark Ruthkosky
*Assistant Examiner*—Keith Walker
(74) *Attorney, Agent, or Firm*—Hogan & Hartson LLP

(57) ABSTRACT

A fuel cell comprising a gas-permeable and electrically conducting support substrate having a fuel gas passage formed therein; a fuel-electrode layer formed on said substrate; a solid electrolytic layer formed on said support substrate so as to cover said fuel-electrode layer and containing $ZrO_2$ in which rare earth elements are existing in the form of solid solutions; and an oxygen-electrode provided on the solid electrolytic layer so as to face said fuel-electrode layer; wherein said support substrate is formed of a metal of the iron family and/or an oxide of a metal of the iron family, and a rare-earth oxide containing at least one kind of element selected from the group consisting of Y, Lu, Yb, Tm, Er, Ho, Dy, Gd, Sm and Pr. The invention brings a coefficient of thermal expansion of the support substrate close to that of the solid electrolytic layer, and prevents a reduction in the performance of the solid electrolyte caused by the diffusion of elements from the support substrate.

8 Claims, 3 Drawing Sheets

FUEL CELL

BACKGROUND OF THE INVENTION

1. Field of the Invention

The present invention relates to a fuel cell and to a fuel cell assembly.

2. Description of the Related Art

To obtain energy of the next generation, there have recently been proposed a variety of fuel cells by containing a stack of fuel cells in a container.

FIG. 3 is a diagram illustrating a stack of conventional solid oxide fuel cells. In this stack of cells, a plurality of fuel cell 1 are regularly arranged, a collector member 5 made of a metal felt is interposed between one fuel cell 1$a$ and another neighboring fuel cell 1$b$, and a fuel-electrode 7 of one fuel-cell 1$a$ is electrically connected to an oxygen-electrode (air-electrode) 11 of another fuel cell 1$b$.

The fuel cell1 (1$a$, 1$b$) is constituted by a solid electrolyte 9 and the oxygen-electrode 11 composed of electrically conducting ceramics, that are provided in this order on the outer peripheral surface of the fuel-electrode of a cylindrical cermet (of which the interior serves as a fuel gas passage). An interconnect 13 is provided on the surface of the fuel-electrode 7 covered with neither the solid electrolyte 9 nor the oxygen-electrode 11. As will be obvious from FIG. 3, the interconnect 13 is electrically connected to the fuel-electrode 7 so will not to be connected to the oxygen-electrode 11.

The interconnect 13 is made of electrically conducting ceramics which is subject to be little degraded with an oxygen-containing gas such as a fuel gas or the air. The electrically conducting ceramics must be so dense as to reliably shut the fuel gas flowing inside the fuel-electrode 7 off the oxygen-containing gas flowing outside the oxygen-electrode 11.

The collector member 5 provided between the neighboring fuel cells 1$a$ and 1$b$ is electrically connected to the fuel-electrode 7 of the one fuel cell 1$a$ through the interconnect 13, and is further directly connected to the oxygen-electrode 11 of the other fuel cell 1$b$, so that the neighboring fuel cells are connected together in series.

A fuel cell assembly is constituted by containing the cell stack having the above-mentioned structure in a container, and generates electricity at 600 to 1000° C. by flowing the fuel gas (hydrogen) into the fuel rod 7 and flowing the air (oxygen) into the oxygen-electrode 11.

In the fuel cell constituting the above-mentioned fuel cell assembly, in general, the fuel-electrode 7 is formed of Ni and yttria stabilized zirconia (YSZ), the solid electrolyte 9 is formed of $ZrO_2$(YSZ) containing $Y_2O_3$, and the oxygen-electrode 11 is constituted by a perovskite composite oxide of the type of lanthanum manganate.

As a method of producing the above fuel cell, there has been known a so-called co-firing method which forms the fuel cell by co-firing the fuel-electrode 7 and the solid electrolyte 9. The co-firing method is a very simple process requiring a decreased number of steps for production, featuring increased yield in the production of cells, and is advantageous for decreasing the cost.

However, the conventional fuel cells are accompanied by such problems that the fuel-electrode 7 is cracked when the fuel-electrode 7 and the solid electrolyte 9 are co-fired, and the solid electrolyte 9 peels off the fuel-electrode 7 which is a support member. That is, the solid electrolyte 9 is formed of $ZrO_2$ containing $Y_2O_3$ having a coefficient of thermal expansion of $10.8 \times 10^{-6}/°$ C. Here, however, the fuel-electrode 7 supporting the solid electrolyte 9 contains Ni having a coefficient of thermal expansion of $16.3 \times 10^{-6}/°$ C. which is very larger than that of YSZ. At the time of co-firing, therefore, there develops a large difference in the thermal expansion between the solid electrolyte 9 and the fuel-electrode 7 supporting it. As a result, there occur such problems as cracking of the fuel-electrode 7 and peeling of the solid electrolyte 9.

In order to solve the above problems, further, it has been proposed to use mulite ($3Al_2O_3 \cdot 2SiO_2$) and spinel ($MgAl_2O_4$, $CaAl_2O_4$) and to form the fuel-electrode 7 by using them in combination with Ni (see Japanese Unexamined Patent Publication (Kokai) No. 29574/1995).

According to the above proposal, the coefficient of thermal expansion of the fuel-electrode 7 is brought close to the coefficient of thermal expansion of the solid electrolyte 9, making it possible to suppress the occurrence of cracks in the fuel-electrode 7 and the peeling of the fuel-electrode 7 from the solid electrolyte 9 at the time of co-firing. There, however, arouses a new problem in that the components such as Mg, Al and Si in the fuel-electrode diffuse into the solid electrolyte 9 at the time of co-firing, whereby the ionic conductivity of the solid electrolyte 9 decreases and the generating performance of the fuel cell decreases.

SUMMARY OF THE INVENTION

It is therefore an object of the present invention to provide a fuel cell which not only effectively suppresses the occurrence of cracks in the fuel-electrode and the peeling of the solid electrolyte at the time of co-firing but also suppresses the reduction of performance such as a decrease in the ionic conductivity caused by the diffusion of elements into the solid electrolyte, and which can be inexpensively produced by the co-firing method.

According to the present invention, there is provided a fuel cell unit comprising:

a gas-permeable and electrically conducting support substrate having a fuel gas passage formed therein;

a fuel-electrode layer formed on said support substrate;

a solid electrolytic layer formed on said support substrate so as to cover said fuel-electrode layer and containing $ZrO_2$ in which a rare earth element is existing in the form of solid solutions; and an oxygen-electrode provided on the solid electrolytic layer so as to face said fuel-electrode layer; wherein said support substrate is formed of a metal of the iron family and/or an oxide of a metal of the iron family, and a rare-earth oxide containing at least one kind of element selected from the group consisting of Y, Lu, Yb, Tm, Er, Ho, Dy, Gd, Sm and Pr.

Namely, in the present invention, the support substrate in each of the members constituting the cell is formed by a metal of the iron family or an oxide thereof (such as Ni or NiO) and a particular rare-earth oxide, and makes it possible to effectively avoid various inconveniences caused by the co-firing.

For example, the above rare-earth oxide in the support substrate does not almost form a solid solution with, or does not almost react with, the metal of the iron family or with the oxide thereof during the firing or during the generation of electricity. Besides, the rare-earth oxide has a coefficient of thermal expansion which is very smaller than the coefficient of thermal expansion (about $10.8 \times 10^{-6}/°$ C.) of $ZrO_2$ (hereinafter often referred to as stabilized zirconia) in which rare earth elements are existing in the form of solid solutions in the solid electrolytic layer or in the fuel-electrode layer. For example, $Y_2O_3$ or $Yb_2O_3$ has a coefficient of thermal expansion of about $8.14\times10^{-6}/°C$. By controlling the content of the rare-earth oxide such as $Y_2O_3$ or $Yb_2O_3$, therefore, it is allowed to bring the coefficient of thermal expansion of the support substrate close to the coefficient of thermal expansion of the solid electrolytic layer or of the fuel-electrode layer and, hence, to effectively suppress the occurrence of cracks or peeling caused by a difference in the coefficient of thermal expansion.

Besides, the metal of the iron family, the oxides thereof and the particular rare-earth oxide constituting the support substrate all tend to be diffused little. Even when the support substrate and the solid electrolytic layer are co-fired, therefore, the rare earth element is effectively suppressed from diffusing into the solid electrolytic layer avoiding adverse effect on the ionic conductivity of the solid electrolytic layer. Even if the rare earth element has diffused during the co-firing, the effect of diffusion of the rare earth element in the solid electrolyte can be minimized since the solid electrolytic layer has been constituted by $ZrO_2$ (stabilized zirconia) in which rare-earth oxides such as $Y_2O_3$ and $Yb_2O_3$ have been contained in the form of solid solutions.

DETAILED DESCRIPTION OF THE INVENTION

Figure 1:
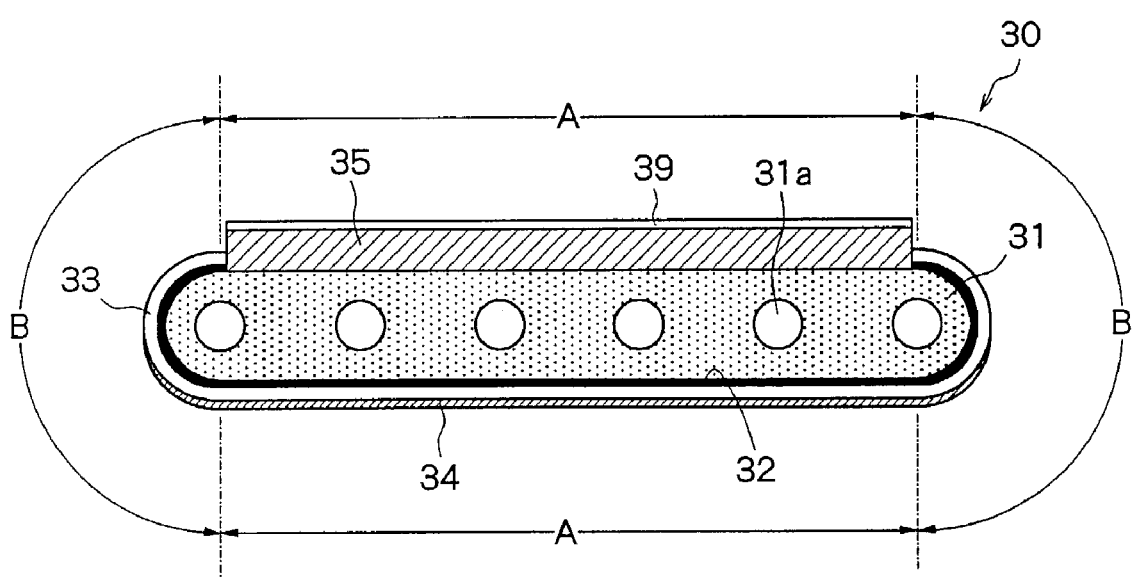
FIG. 1 is a transverse sectional view illustrating a fuel cell according to the present invention.
Figure 2:
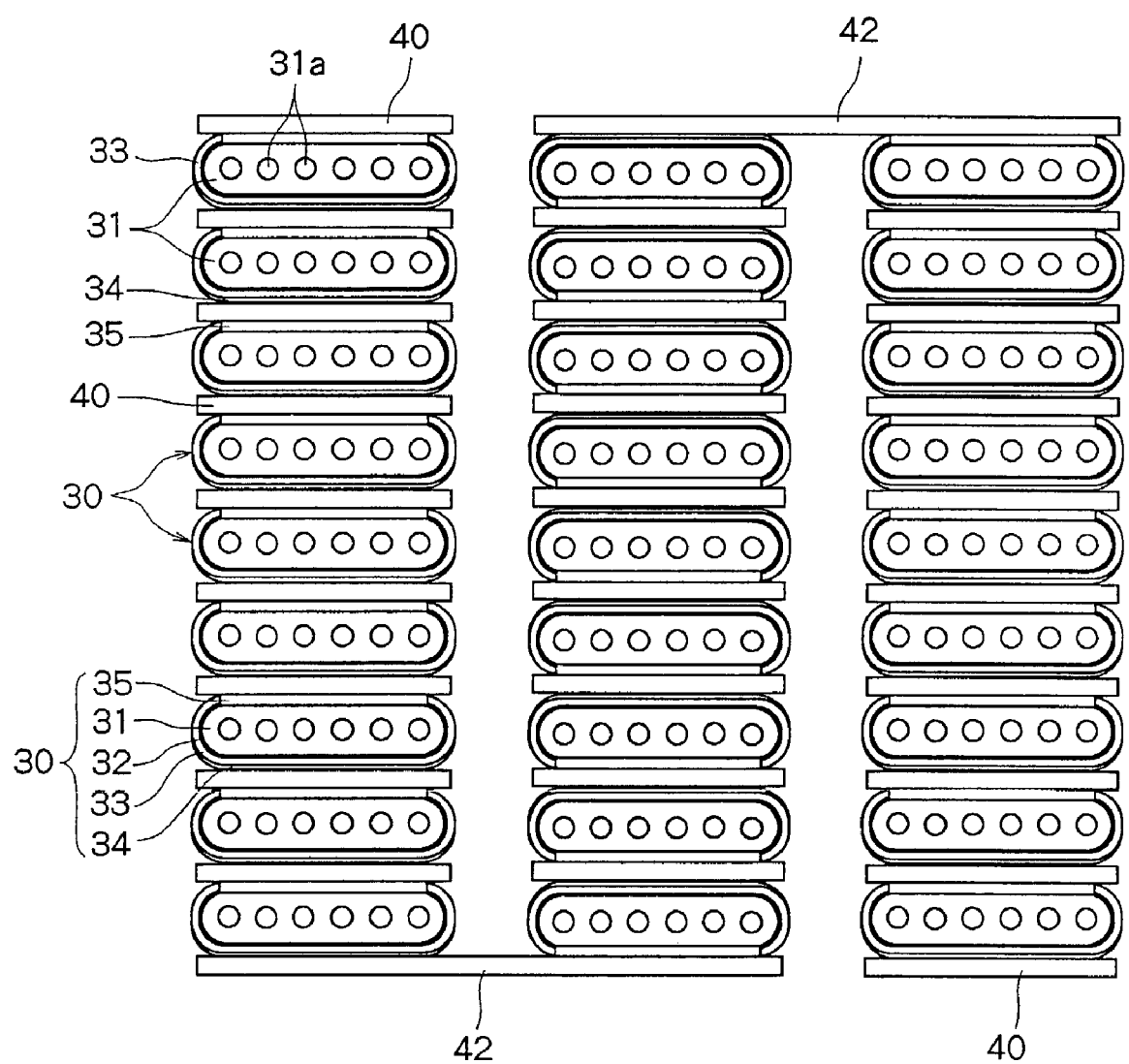
FIG. 2 is a transverse sectional view illustrating a cell stack formed by a plurality of fuel cells.
Figure 3:
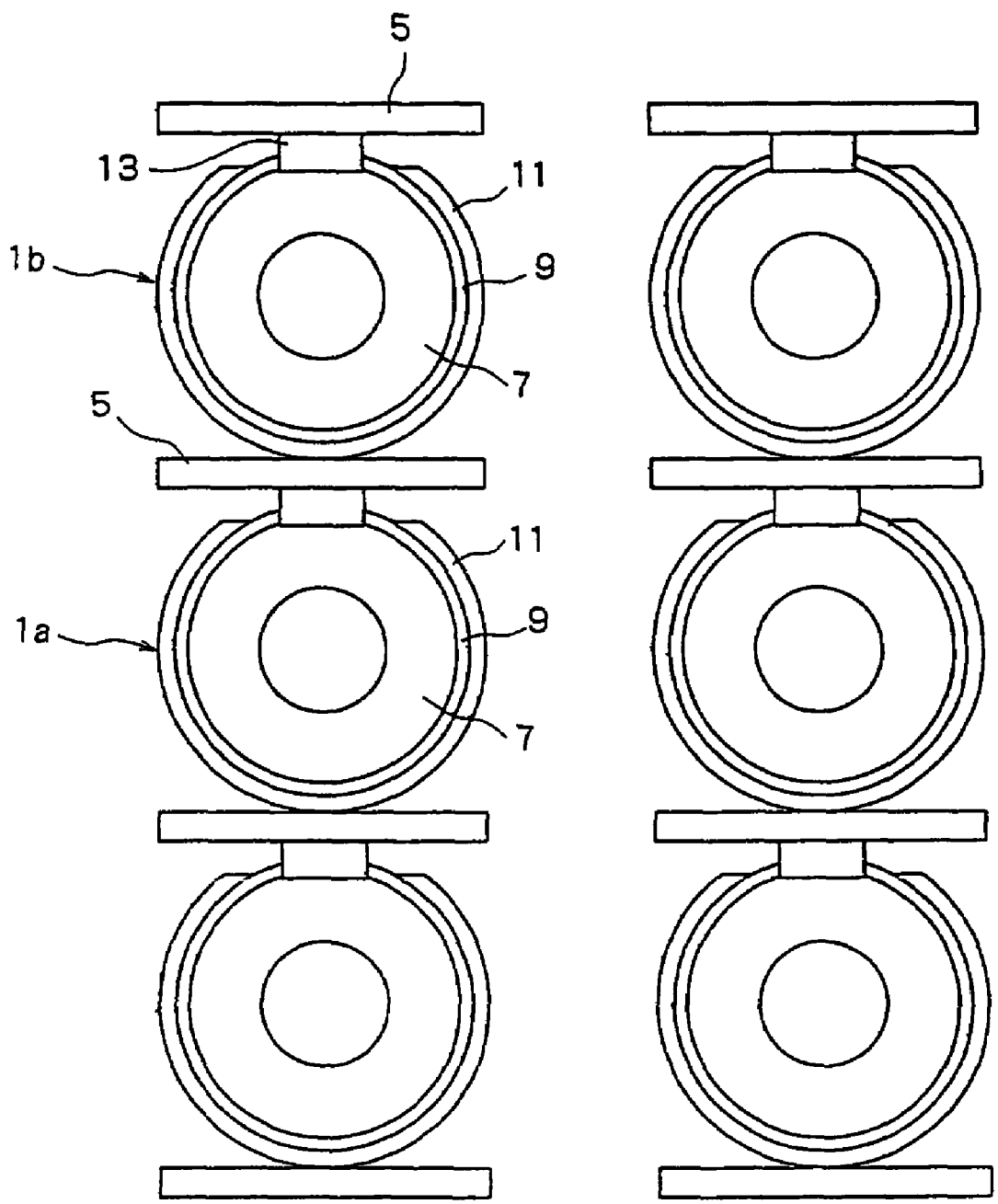
FIG. 3 is a transverse sectional view illustrating a cell stack constituted by conventional fuel cells.

In FIG. 1 which is a transverse sectional view of a fuel cell of the present invention, the fuel cell which is generally designated at 30 has a support substrate 31 which is flat in cross section and is of an elliptic cylindrical shape as viewed generally. A plurality of fuel gas passages 32 31a are formed maintaining a suitable distance in the support substrate 31. The fuel cell 30 has a structure in which various kinds of members are provided on the support substrate 31. A plurality of the above fuel cells 30 are connected to each other in series through collector members 40 as shown in FIG. 2 thereby to form a cell stack for constituting a fuel cell assembly.

As will be understood from the shape shown in FIG. 1, the support substrate 31 comprises a flat portion A and arcuate portions B at both ends of the flat portion A. Both surfaces of the flat portion A are formed nearly in parallel with each other, a fuel-electrode layer 32 is so provided as to cover one surface of the flat portion A and the arcuate portions B on both sides, and a dense solid electrolytic layer 33 is laminated so as to cover the fuel-electrode layer 32. An oxygen-electrode 34 is laminated on the solid electrolytic layer 33 from one surface of the flat portion A toward the arcuate portions B on both sides so as to face the fuel-electrode layer 32. An interconnect 35 is formed on the other surface of the flat portion A on where neither the fuel-electrode layer 32 nor the solid electrode layer 33 has been laminated. As is obvious from FIG. 1, the fuel-electrode layer 32 and the solid electrolytic layer 33 are extending up to both sides of the interconnect 35, so that the surface of the support substrate 31 is not exposed to the outer side.

In the fuel cell of the above structure, a portion of the fuel-electrode layer 32 facing the oxygen-electrode 34 works as the fuel-electrode to generate electricity. Namely, the oxygen-containing gas such as the air is supplied to the outside of the oxygen-electrode 34, the fuel gas (hydrogen) is supplied to the gas passages in the support substrate 31, and the temperature is elevated up to a predetermined operation temperature, whereby the electrode reaction of the following formula (1) takes places on the oxygen-electrode 34, and the electrode reaction of, for example, the following formula (2) takes place on a portion of the fuel-electrode layer 32 that serves as the fuel-electrode to thereby generate electricity, Oxygen-electrode: $\frac{1}{2}O_2 + 2e^- \rightarrow O^{2-}$ (solid electrolyte)     (1)

Fuel-electrode: $O^{2-}$ (solid electrolyte) $+ H_2 \rightarrow H_2O + 2e^-$     (2)

The electric current produced by the above generation is collected through the interconnect 35 mounted on the support substrate 31.

(Support Substrate 31)

In the fuel cell 30 of the present invention having the above structure, the support substrate 31 must be gas-permeable to permit the permeation of the fuel gas to the fuel-electrode layer 32, and must be electrically conducting to collect electricity through the interconnect. In order to satisfy the above requirements and to alleviate inconvenience caused by co-firing, the support substrate 31 is constituted by a metal component of the iron family and a particular rare-earth oxide.

The metal component of the iron family is to impart electrically conducting property to the support substrate 31, and may be a simple metal of the iron family, an oxide of the metal of the iron family, an alloy of the metal of the iron family or an oxide of the alloy. The metal of the iron family may be iron, nickel or cobalt, and any one of them may be used in the present invention. From the standpoint of cost and stability in the fuel gas, however, it is desired that Ni and/or NiO is contained as the component of the iron family.

The rare-earth oxide component is used for bringing the coefficient of thermal expansion of the support substrate 31 close to that of the stabilized zirconia forming the solid electrolytic layer 33. In order to maintain a high electronic conductivity and to prevent diffusion into the solid electrolytic layer 33, therefore, an oxide containing at least one kind of rare earth element selected from the group consisting of Y, Lu, Yb, Tm, Er, Ho, Dy, Gd, Sm and Pr is used in combination with the above component of the iron family. Concrete examples of the rare-earth oxide include $Y_2O_3$, $Lu_2O_3$, $Yb_2O_3$, $Tm_2O_3$, $Er_2O_3$, $Ho_2O_3$, $Dy_2O_3$, $Gd_2O_3$, $Sm_2O_3$ and $Pr_2O_3$. Among them, however, $Y_2O_3$ and $Yb_2O_3$ are particularly desired since they are inexpensive.

From the standpoint of bringing the coefficient of thermal expansion of the support substrate 31 close to that of the stabilized zirconia, in particular, it is desired in the present invention that the above component of the iron family is contained in an amount of from 35 to 65% by volume in the support substrate 31 and that the rare-earth oxide is contained in an amount of from 35 to 65% by volume in the support substrate 31. The support substrate 31 may further contain other metal components and oxide components in a range in which they do not impair the required properties.

It is essential that the support substrate 31 constituted by the above metal component of the iron family and the rare-earth oxide has fuel gas-permeating property and, hence, has an open porosity which is not usually smaller than 30% and, particularly, in a range of from 35 to 50%. It is further desired that the support substrate 31 has an electronic conductivity of not smaller than 300 S/cm and, particularly, not smaller than 440 S/cm.

It is desired that the support substrate 31 has the flat portion A of a length of, usually, from 15 to 35 mm, has the arcuate portions B of a length (length of arc) of from about 3 to about 8 mm, and has a thickness (gap between both surfaces of the flat portion A) of from about 2.5 to about 5 mm.

(Fuel-Electrode Layer 32)

In the present invention, the fuel-electrode layer 32 is for producing the electrode reaction of the above formula (2) and is by itself formed of known porous and electrically conducting ceramics. For example, the fuel-electrode layer 32 is formed of $ZrO_2$ in which rare earth elements are contained in the form of solid solutions and Ni and/or NiO. As $ZrO_2$ (stabilized zirconia) in which rare earth elements are contained in the form of solid solutions, there can be used those described below that have been used for the formation of the solid electrolytic layer 33.

It is desired that the fuel-electrode layer 32 contains the stabilized zirconia in an amount in a range of from 35 to 65% by volume, and contains Ni or NiO in an amount in a range of from 65 to 35% by volume. It is further desired that the fuel-electrode layer 32 has an open porosity of not smaller than 15% and, particularly, in a range of from 20 to 40%, and has a thickness of from 1 to 30 μm. When the fuel-electrode layer 32 is too thin, the performance may decrease. When it is too thick, on the other hand, peeling may occur between the solid electrolytic layer 33 and the fuel-electrode layer 32 due to a difference in the thermal expansion.

In the example of FIG. 1, the fuel-electrode layer 32 is extending up to both sides of the intrconnector 35. The fuel-electrode, however, needs be formed at a position facing the oxygen-electrode 34. Therefore, the fuel-electrode layer 32 may be formed, for example, on only the flat portion A on the side where the oxygen-electrode 34 is provided. The fuel-electrode layer 32 may further be formed over the whole circumference of the support substrate 31. In the present invention, it is desired that the solid electrolytic layer 33 as a whole is formed on the fuel-electrode layer 32 in order to increase the junction strength between the solid electrolytic layer 33 and the support substrate 31.

(Solid Electrolytic Layer 33)

The solid electrolytic layer 33 on the fuel-electrode layer 32 is usually formed of dense ceramics comprising $ZrO_2$ in which 3 to 15% by mol of rare earth elements are contained in the form of solid solutions (called stabilized zirconia). As the rare earth elements, there can be exemplified Sc, Y, La, Ce, Pr, Nd, Pm, Sm, Eu, Gd, Tb, Dy, Ho, Er, Tm, Yb and Lu. Among them, however, Y and Yb are desired since they are inexpensive.

It is desired that the stabilized zirconia ceramics forming the solid electrolytic layer 33 has a relative density (according to Archimedes' method) of not smaller than 93% and, particularly, not smaller than 95% from the standpoint of preventing the permeation of gas and has a thickness of from 10 to 100 μm.

(Oxygen-Electrode 34)

The oxygen-electrode 34 is formed of electrically conducting ceramics which is a perovskite-type oxide of the so-called $ABO_3$ type. As the perovskite-type oxide, there can be preferably used at least one kind of perovskite-type oxide of a transition metal and, particularly, an $LaMnO_3$-type oxide having La on the A-site, an $La-FeO_3$-type oxide or an $LaCoO_3$-type oxide and, particularly, the $LaFeO_3$-type oxide from the standpoint of a high electrically conducting property at an operation temperature of from about 600 to about 1000° C. In the above perovskite-type oxide, La and Sr may exist on the A-site and, besides, Fe as well as Co and Mn may exist on the B-site.

The oxygen-electrode 34 must be gas-permeable. It is, therefore, desired that the electrically conducting ceramics (perovskite-type oxide) forming the oxygen-electrode 34 has an open porosity of not smaller than 20% and, particularly, in a range of from 30 to 50%.

It is desired that the oxygen-electrode 34 has a thickness of from 30 to 100 μm from the standpoint of collecting electricity.

(Interconnect 35)

The interconnect 35 formed on the support substrate 31 at a position facing the oxygen-electrode 34 comprises electrically conducting ceramics, and must have resistance against reduction and oxidation since it comes in contact with the fuel gas (hydrogen) and the oxygen-containing gas. As the above electrically conducting ceramics, there is usually used a perovskite oxide ($LaCrO_3$ oxide) of the type of lanthanum chromite. In order to prevent the leakage of the fuel gas passing through the inside of the support substrate 31 and of the oxygen-containing gas passing through the outside of the support substrate 31, further, the electrically conducting ceramics must be dense and must desirably have a relative density of, for example, not smaller than 93% and, particularly, not smaller than 95%.

It is desired that the interconnect 35 has a thickness of from 10 to 200 μm from the standpoint of preventing the leakage of gas and electric resistance. When its thickness is smaller than this range, the gas tends to leak. When the thickness is greater than this range, on the other hand, the electric resistance becomes so great that the function for collecting electricity may decrease due to a drop in the potential.

As is obvious from FIG. 1, further, the dense solid electrolytic layer 33 is intimately adhered onto both sides of the interconnect 35 to prevent the leakage of gas. In order to enhance the sealing performance, further, a junction layer (not shown) of, for example, $Y_2O_3$ may be provided between both side surfaces of the intrconnector 35 and the solid electrolytic layer 33.

It is desired that a P-type semiconductor layer 39 is formed on the outer surface (upper surface) of the interconnect 35. Namely, in a cell stack (see FIG. 2) assembled by the fuel cells the electrically conducting collector member 40 is connected to the interconnect 35. If the collector member 40 is directly connected to the interconnect 35, however, the potential decreases to a large degree due to the non-ohmic contact, and electricity-collecting performance decreases. With the collector member 40 being connected to the interconnect 35 via the P-type semiconductor layer 39, however, the ohmic connection is established between the two, whereby a drop in the potential decreases, a drop in the electricity-collecting performance is effectively alleviated, and an electric current of, for example, from the oxygen-electrode 34 of from one fuel cell 30 is efficiently transferred to the support substrate 31 of the other fuel cell 30. As the P-type semiconductor of this kind, there can be exemplified a perovskite oxide of a transition metal. Concretely speaking, there can be used P-type semiconductor ceramics having an electron conductivity greater than that of the $LaCrO_3$ oxide constituting the interconnect 35, for example, at least the one of the $LaMnO_3$ oxide, $LaFeO_3$ oxide or $LaCoO_3$ oxide in which Mn, Fe or Co is present on the B-site. It is desired that the P-type semiconductor layer 39 has a thickness of, usually, in a range of from 30 to 100 μm.

The interconnect 35 can be directly formed on the flat portion A of the support substrate 31 on the side where the solid electrolytic layer 33 has not been formed. On this portion, too, however, the fuel-electrode layer 32 may be formed, and the interconnect 35 may be formed on the fuel-electrode layer 32. That is, the fuel-electrode layer 32 may be formed on the whole circumference of the support substrate 31, and the interconnect 35 may be formed on the fuel-electrode layer 32. Namely, formation of the interconnect 35 on the support substrate 31 via the fuel-electrode layer 32 is advantageous from the standpoint of suppressing a drop of potential on the interface between the support substrate 31 and the interconnect 35.

(Fabrication of the Fuel Cell)

The fuel cell having the above-mentioned structure is fabricated as described below.

First, a powder of a metal of the iron family such as Ni or of an oxide thereof, a powder of a rare-earth oxide such as $Y_2O_3$, an organic binder and a solvent are mixed together to prepare a slurry thereof. The slurry is extrusion-molded to obtain a support substrate which is, then, dried.

Next, the materials for forming the fuel-electrode layer (Ni or NiO powder and stabilized zirconia powder), an organic binder and a solvent are mixed together to prepare a slurry from which a sheet is prepared for forming the fuel-electrode layer. Instead of preparing the sheet for the fuel-electrode layer, further, a paste obtained by dispersing the fuel-electrode-forming materials in a solvent may be applied onto a predetermined position of the support substrate-forming molded body obtained above followed by drying to form a coating layer for forming the fuel-electrode layer.

Further, the stabilized zirconia powder, the organic binder and the solvent are mixed together to prepare a slurry. By using this slurry, a sheet is prepared for forming the solid electrolytic layer.

The support substrate-forming molded body obtained above, the sheet for the fuel-electrode and the sheet for the solid electrolytic layer are laminated to constitute a layer structure shown in, for example, FIG. 1, and are dried. Here, when the coating layer for the fuel-electrode layer has been formed on the surface of the support substrate-forming molded body, the sheet for the solid electrolytic layer only may be laminated on the support substrate-forming molded body and may be dried.

Then, the material for the interconnect (e.g., $LaCrO_3$ oxide powder), the organic binder and the solvent are mixed together to prepare a slurry thereof, and a sheet is prepared for forming the interconnect.

The sheet for forming the interconnect is further laminated on a predetermined position of the laminate obtained above, thereby to prepare a laminate for firing.

The laminate for firing is subjected to the processing for removing the binder and is co-fired in an oxygen-containing atmosphere at 1300 to 1600° C. The obtained sintered body is coated at a predetermined position with a paste containing a material for forming the oxygen-electrode (e.g., $LaFeO_3$ oxide powder) and a solvent and, as required, with a paste containing a material for forming the P-type semiconductor layer (e.g., $LaFeO_3$ oxide powder) and a solvent by dipping or the like, and is fired at 1000 to 1300° C. to produce the fuel cell 30 of the present invention having the structure shown in FIG. 1.

When Ni alone is used for the formation of the support substrate 31 and the fuel-electrode layer 32, Ni is oxidized into NiO due to the firing in the oxygen-containing atmosphere. As required, however, the reduction processing may be effected to return NiO back to Ni. Besides, NiO is exposed to the reducing atmosphere while generating electricity and is returned back to Ni.

(Cell Stack)

Referring to FIG. 2, the cell stack is constituted by a set of a plurality of the above-mentioned fuel cells 30 which are connected to each other in series with the collector member 40 constituted by a metal felt and/or a metal plate interposed among the fuel cells 30 neighboring up and down. Namely, the support substrate 31 of one fuel cell 30 is electrically connected to the oxygen-electrode 34 of the other fuel cell 30 through the interconnect 35, P-type semiconductor layer 39 and collector member 40. As shown in FIG. 2, further, the cell stacks are arranged side by side, and the neighboring cell stacks are connected in series through an electrically conducting member 42.

The fuel cell assembly of the present invention is constituted by containing the cell stack of FIG. 2 in a container. The container is provided with introduction pipes for introducing the fuel gas such as hydrogen into the fuel cell 30 from an external unit and with introduction pipes for introducing the oxygen-containing gas such as the air into external space of the fuel cell 30. When heated at a predetermined temperature (e.g., 600 to 900° C.), the fuel cells generate electricity, and the fuel gas and the oxygen-containing gas after used are discharged out of the container.

The present invention is in no way limited to the above embodiment only but can be modified in a variety of other ways without modifying the gist of the invention. For example, the support substrate 31 may be formed in a cylindrical shape, or an intermediate layer having a suitable degree of electronic conductivity may be formed between the oxygen-electrode 34 and the solid electrolytic layer 33.

In the fuel unit of the present invention, the fuel-electrode layer, the solid electrolytic layer and the oxygen-electrode are provided on the support substrate formed by using a metal of the iron family such as Ni or an oxide thereof and a particular rare-earth oxide such as $Y_2O_3$ to effectively alleviate inconvenience such as peeling of the solid electrolytic layer and the occurrence of cracks due to a difference in the thermal expansion. That is, the coefficient of thermal expansion is brought close to that of the support substrate. Therefore, the fuel cell unit of the present invention is produced by co-firing inexpensively and maintaining a high yield.

Further, the particular rare-earth oxide such as $Y_2O_3$ existing in the support substrate diffuses little in the solid electrolytic layer at the time of co-firing and does not adversely affect the ionic conductivity of the solid electrolyte or the electronic conductivity of the electrode of the oxygen side. Besides, the solid electrolytic layer itself has been constituted by $ZrO_2$ in which rare earth elements such as $Y_2O_3$ and $Yb_2O_3$ have been contained in the form of solid solutions. Therefore, even if the rare-earth oxides in the support substrate diffuse into the solid electrolytic layer at the time of co-firing, their effect is minimized. The rare-earth oxides such as $Y_2O_3$ and $Yb_2O_3$ present in the support substrate are used for stabilizing the zirconia that forms the solid electrolytic layer. Therefore, the fuel cell of the present invention is advantageous since it can be produced by using small number of elements and at a low cost.

EXAMPLES (Experiment 1)

An NiO powder or an Ni powder having an average particle size of 0.5 μm and rare-earth oxide powders (average particle sizes of 0.8 to 1.0 μm) shown in Tables 1 to 5 were mixed together such that the volume ratios after firing were as shown in Tables 1 to 5 (samples Nos. 1 to 92).

Further, composite rare-earth oxide powders (average particle sizes of 0.8 to 1.0 μm) shown in Table 6 and the above Ni or NiO powder were mixed together at ratios shown in Table 6 (samples Nos. 93 to 124).

The amounts of NiO powder in Tables 1 to 6 are those calculated as Ni. For example, sample No. 1 has a meaning in that the NiO powder and the $Y_2O_3$ powder were mixed together, and, after firing, NiO was 65% by volume calculated as Ni and $Y_2O_3$ was 35% by volume.

The compositions of composite rare-earth oxide powders shown in Table 6 are those found by being converted into weight ratios of stable oxides from the molar ratios (measured) of the constituent elements in the starting powders and by, further, being converted into volume ratios of stable oxides.

The above mixed powders were further mixed with a pore-imparting agent, an organic binder (polyvinyl alcohol) and water (solvent) to prepare slurries for the support substrate. The slurries were, then, extrusion-molded into rectangular parallelopiped articles, dried, put to the processing for removing the binder, and were fired in the atmosphere at 1500° C.

The obtained sintered bodies were machined into a length of 20 mm, measured for their coefficients of thermal expansion in the atmosphere and in a reducing atmosphere of an oxygen partial pressure of about $10^{-19}$ Pa at room temperature to 1000° C., and were further measured for their electric conductivities in a reducing atmosphere of an oxygen partial pressure of about $10^{-19}$ Pa at 1000° C. based on the four-terminal method. The results were as shown in Tables 1 to 6.

As comparative examples, further, there were used a mixed powder (sample No. 13 of Table 1) of the NiO powder having an average particle size of 0.5 μm and a YSZ ($Y_2O_3$, stabilized zirconia) having an average particle size of 0.4 μm, and a mixed powder (sample No. 14 of Table 1) of the NiO powder having an average particle size of 0.5 μm and a spinel ($MgAl_2O_4$) powder having an average particle size of 0.5 μm. These powders were mixed with a pore-imparting agent, an organic binder (polyvinyl alcohol) and water (solvent), were fired under the same conditions as those described above, and were measured for their coefficients of thermal expansion and electric conductivities. The results were as shown in Table 1.

TABLE 1

| Sample No. | NiO powder vol % | Ni powder vol % | $Y_2O_3$ powder vol % | $Yb_2O_3$ powder vol % | Thermal expansion coefficient $\alpha \times 10^{-6}$ | | Electronic conductivity S/cm |
|---|---|---|---|---|---|---|---|
| | | | | | Air | Reducing atmosphere | |
| 1 | 65 | — | 35 | — | 13.5 | 13.4 | 620 |
| 2 | — | 65 | 35 | — | 13.6 | 13.5 | 620 |
| 3 | 60 | — | 40 | — | 13.2 | 13.3 | 570 |
| 4 | — | 60 | 40 | — | 13.2 | 13.1 | 580 |
| 5 | 50 | — | 50 | — | 12.4 | 12.4 | 510 |
| 6 | — | 50 | 50 | — | 12.4 | 12.4 | 500 |
| 7 | 35 | — | 65 | — | 11.2 | 11.1 | 450 |
| 8 | — | 35 | 65 | — | 11.2 | 11.2 | 460 |
| 9 | 60 | — | — | 40 | 13.3 | 13.2 | 580 |
| 10 | — | 60 | — | 40 | 13.3 | 13.3 | 560 |
| 11 | 50 | — | 25 | 25 | 13.2 | 13.2 | 510 |
| 12 | 25 | 25 | 50 | — | 12.4 | 12.4 | 500 |
| *13 | 60 | — | YSZ | 40 | 14.2 | 14.3 | 570 |
| *14 | 60 | — | spinel | 40 | 12.2 | 12.1 | 560 |

*outside the scope of the invention

TABLE 2

| Sample No. | NiO powder vol % | Ni powder vol % | $Lu_2O_3$ powder vol % | $Tm_2O_3$ powder vol % | $Er_2O_3$ powder vol % | Thermal expansion coefficient $\alpha \times 10^{-6}$ | | Electronic conductivity S/cm |
|---|---|---|---|---|---|---|---|---|
| | | | | | | Air | Reducing atmosphere | |
| 15 | 65 | — | 35 | — | — | 13.6 | 13.5 | 610 |
| 16 | — | 65 | 35 | — | — | 13.6 | 13.5 | 620 |
| 17 | 60 | — | 40 | — | — | 13.3 | 13.3 | 570 |
| 18 | — | 60 | 40 | — | — | 13.2 | 13.2 | 580 |
| 19 | 50 | — | 50 | — | — | 12.7 | 12.6 | 520 |
| 20 | — | 50 | 50 | — | — | 12.6 | 12.5 | 510 |
| 21 | 35 | — | 65 | — | — | 11.4 | 11.3 | 450 |
| 22 | — | 35 | 65 | — | — | 11.4 | 11.3 | 460 |
| 23 | 25 | 25 | 50 | — | — | 12.6 | 12.7 | 510 |
| 24 | 65 | — | — | 35 | — | 13.6 | 13.5 | 610 |
| 25 | — | 65 | — | 35 | — | 13.5 | 13.6 | 620 |
| 26 | 60 | — | — | 40 | — | 13.3 | 13.3 | 570 |
| 27 | — | 60 | — | 40 | — | 13.3 | 13.2 | 560 |

TABLE 2-continued

| Sample No. | NiO powder vol % | Ni powder vol % | Lu$_2$O$_3$ powder vol % | Tm$_2$O$_3$ powder vol % | Er$_2$O$_3$ powder vol % | Thermal expansion coefficient $\alpha \times 10^{-6}$ Air | Reducing atmosphere | Electronic conductivity S/cm |
|---|---|---|---|---|---|---|---|---|
| 28 | 50 | — | — | 50 | — | 12.7 | 12.6 | 510 |
| 29 | — | 50 | — | 50 | — | 12.7 | 12.6 | 500 |
| 30 | 35 | — | — | 65 | — | 11.4 | 11.4 | 450 |
| 31 | — | 35 | — | 65 | — | 11.4 | 11.3 | 460 |
| 32 | 25 | 25 | — | 50 | — | 12.6 | 12.6 | 500 |
| 33 | 65 | — | — | — | 35 | 13.5 | 13.4 | 630 |
| 34 | — | 65 | — | — | 35 | 13.5 | 13.6 | 620 |
| 35 | 60 | — | — | — | 40 | 13.3 | 13.2 | 580 |
| 36 | — | 60 | — | — | 40 | 13.4 | 13.3 | 560 |
| 37 | 50 | — | — | — | 50 | 12.5 | 12.4 | 510 |
| 38 | — | 50 | — | — | 50 | 12.5 | 12.6 | 510 |
| 39 | 35 | — | — | — | 65 | 11.4 | 11.6 | 450 |
| 40 | — | 35 | — | — | 65 | 11.4 | 11.3 | 460 |
| 41 | 25 | 25 | — | — | 50 | 12.5 | 12.4 | 510 |

TABLE 3

| Sample No. | NiO powder vol % | Ni powder vol % | Ho$_2$O$_3$ powder vol % | Dy$_2$O$_3$ powder vol % | Gd$_2$O$_3$ powder vol % | Thermal expansion coefficient $\alpha \times 10^{-6}$ Air | Reducing atmosphere | Electronic conductivity S/cm |
|---|---|---|---|---|---|---|---|---|
| 42 | 65 | — | 35 | — | — | 13.7 | 13.6 | 620 |
| 43 | — | 65 | 35 | — | — | 13.6 | 13.5 | 620 |
| 44 | 60 | — | 40 | — | — | 13.3 | 13.0 | 580 |
| 45 | — | 60 | 40 | — | — | 13.3 | 13.1 | 570 |
| 46 | 50 | — | 50 | — | — | 12.6 | 12.7 | 500 |
| 47 | — | 50 | 50 | — | — | 12.5 | 12.5 | 510 |
| 48 | 35 | — | 65 | — | — | 11.6 | 11.5 | 460 |
| 49 | — | 35 | 65 | — | — | 11.5 | 11.6 | 460 |
| 50 | 25 | 25 | 50 | — | — | 12.6 | 12.6 | 500 |
| 51 | 65 | — | — | 35 | — | 13.6 | 13.4 | 610 |
| 52 | — | 65 | — | 35 | — | 13.5 | 13.5 | 600 |
| 53 | 60 | — | — | 40 | — | 13.2 | 13.0 | 580 |
| 54 | — | 60 | — | 40 | — | 13.2 | 12.9 | 560 |
| 55 | 50 | — | — | 50 | — | 12.5 | 12.5 | 520 |
| 56 | — | 50 | — | 50 | — | 12.4 | 12.4 | 500 |
| 57 | 35 | — | — | 65 | — | 11.3 | 13.3 | 460 |
| 58 | — | 35 | — | 65 | — | 11.3 | 13.3 | 470 |
| 59 | 25 | 25 | — | 50 | — | 12.5 | 12.4 | 490 |
| 60 | 65 | — | — | — | 35 | 13.7 | 13.6 | 620 |
| 61 | — | 65 | — | — | 35 | 13.6 | 13.7 | 620 |
| 62 | 60 | — | — | — | 40 | 13.3 | 13.3 | 580 |
| 63 | — | 60 | — | — | 40 | 13.3 | 13.1 | 570 |
| 64 | 50 | — | — | — | 50 | 12.6 | 12.7 | 520 |
| 65 | — | 50 | — | — | 50 | 12.6 | 12.6 | 500 |
| 66 | 35 | — | — | — | 65 | 11.5 | 11.7 | 450 |
| 67 | — | 35 | — | — | 65 | 11.5 | 11.4 | 460 |
| 68 | 25 | 25 | — | — | 50 | 12.6 | 12.6 | 510 |

TABLE 4

| Sample No. | NiO powder vol % | Ni powder vol % | Sm$_2$O$_3$ powder vol % | Pr$_2$O$_3$ powder vol % | Thermal expansion coefficient $\alpha \times 10^{-6}$ Air | Reducing atmosphere | Electronic conductivity S/cm |
|---|---|---|---|---|---|---|---|
| 69 | 65 | — | 35 | — | 14.0 | 13.9 | 630 |
| 70 | — | 65 | 35 | — | 13.9 | 13.8 | 610 |
| 71 | 60 | — | 40 | — | 13.7 | 13.7 | 580 |
| 72 | — | 60 | 40 | — | 13.7 | 13.6 | 560 |
| 73 | 50 | — | 50 | — | 13.5 | 13.4 | 510 |
| 74 | — | 50 | 50 | — | 13.5 | 13.4 | 520 |
| 75 | 35 | — | 65 | — | 12.6 | 12.7 | 460 |
| 76 | — | 35 | 65 | — | 12.5 | 12.5 | 460 |
| 77 | 25 | 25 | 50 | — | 13.4 | 13.5 | 500 |

TABLE 4-continued

| Sample No. | NiO powder vol % | Ni powder vol % | Sm$_2$O$_3$ powder vol % | Pr$_2$O$_3$ powder vol % | Thermal expansion coefficient $\alpha \times 10^{-6}$ Air | Reducing atmosphere | Electronic conductivity S/cm |
|---|---|---|---|---|---|---|---|
| 78 | 65 | — | — | 35 | 13.5 | 13.3 | 620 |
| 79 | — | 65 | — | 35 | 13.5 | 13.4 | 610 |
| 80 | 60 | — | — | 40 | 13.3 | 13.4 | 580 |
| 81 | — | 60 | — | 40 | 13.4 | 13.3 | 570 |
| 82 | 50 | — | — | 50 | 12.6 | 12.5 | 510 |
| 83 | — | 50 | — | 50 | 12.5 | 12.4 | 520 |
| 84 | 35 | — | — | 65 | 11.3 | 11.4 | 450 |
| 85 | — | 35 | — | 65 | 11.4 | 11.4 | 450 |
| 86 | 25 | 25 | — | 50 | 12.5 | 12.4 | 510 |

TABLE 5

| Sample No. | NiO powder vol % | Ni powder vol % | Nd$_2$O$_3$ powder vol % | CeO$_3$ powder vol % | La$_2$O$_3$ powder vol % | Thermal expansion coefficient $\alpha \times 10^{-6}$ Air | Reducing atmosphere | Electronic conductivity S/cm |
|---|---|---|---|---|---|---|---|---|
| *87 | 50 | — | 50 | — | — | 14.7 | 14.7 | 510 |
| *88 | — | 50 | 50 | — | — | 14.7 | 14.6 | 500 |
| *89 | 50 | — | — | 50 | — | 14.8 | 14.9 | 510 |
| *90 | — | 50 | — | 50 | — | 14.8 | 15.0 | 500 |
| *91 | 50 | — | — | — | 50 | 15.4 | 15.5 | 510 |
| *92 | — | 50 | — | — | 50 | 15.4 | 15.3 | 500 |

TABLE 6

| Sample No. | NiO powder vol % | Ni powder vol % | Composite rare-earth oxide vol % | Composition of rare-earth oxide(vol %) | | | | | Thermal expansion coefficient $\alpha \times 10^{-6}$ | | Electronic conductivity S/cm |
|---|---|---|---|---|---|---|---|---|---|---|---|
| | | | | Y$_2$O$_3$ | Yb$_2$O$_3$ | Dy$_2$O$_3$ | Sm$_2$O$_3$ | Others | Air | Reducing atmosphere | |
| 93 | 65 | — | 35 | 80 | 15 | 4 | 0 | 1 | 13.5 | 13.5 | 620 |
| 94 | — | 65 | 35 | 80 | 15 | 4 | 0 | 1 | 13.6 | 13.4 | 630 |
| 95 | 60 | — | 40 | 80 | 15 | 4 | 0 | 1 | 13.1 | 13.0 | 560 |
| 96 | — | 60 | 40 | 80 | 15 | 4 | 0 | 1 | 13.2 | 13.2 | 570 |
| 97 | 50 | — | 50 | 80 | 15 | 4 | 0 | 1 | 12.6 | 12.5 | 510 |
| 98 | — | 50 | 50 | 80 | 15 | 4 | 0 | 1 | 12.5 | 12.4 | 500 |
| 99 | 35 | — | 65 | 80 | 15 | 4 | 0 | 1 | 11.3 | 11.3 | 460 |
| 100 | — | 35 | 65 | 80 | 15 | 4 | 0 | 1 | 11.3 | 11.3 | 550 |
| 101 | 65 | — | 35 | 50 | 48 | 0 | 1 | 1 | 13.7 | 13.7 | 610 |
| 102 | — | 65 | 35 | 50 | 48 | 0 | 1 | 1 | 13.6 | 13.5 | 620 |
| 103 | 60 | — | 40 | 50 | 48 | 0 | 1 | 1 | 13.3 | 13.2 | 560 |
| 104 | — | 60 | 40 | 50 | 48 | 0 | 1 | 1 | 13.3 | 13.3 | 560 |
| 105 | 50 | — | 50 | 50 | 48 | 0 | 1 | 1 | 12.6 | 12.5 | 510 |
| 106 | — | 50 | 50 | 50 | 48 | 0 | 1 | 1 | 12.5 | 12.4 | 500 |
| 107 | 35 | — | 65 | 50 | 48 | 0 | 1 | 1 | 11.4 | 11.2 | 470 |
| 108 | — | 35 | 65 | 50 | 48 | 0 | 1 | 1 | 11.5 | 11.4 | 460 |
| 109 | 65 | — | 35 | 42 | 38 | 2 | 2 | 16 | 13.6 | 13.5 | 620 |
| 110 | — | 65 | 35 | 42 | 38 | 2 | 2 | 16 | 13.6 | 13.4 | 620 |
| 111 | 60 | — | 40 | 42 | 38 | 2 | 2 | 16 | 13.1 | 13.2 | 570 |
| 112 | — | 60 | 40 | 42 | 38 | 2 | 2 | 16 | 13.3 | 13.3 | 560 |
| 113 | 50 | — | 50 | 42 | 38 | 2 | 2 | 16 | 12.5 | 12.5 | 510 |
| 114 | — | 50 | 50 | 42 | 38 | 2 | 2 | 16 | 12.5 | 12.4 | 500 |
| 115 | 35 | — | 65 | 42 | 38 | 2 | 2 | 16 | 11.5 | 11.5 | 440 |
| 116 | — | 35 | 65 | 42 | 38 | 2 | 2 | 16 | 11.4 | 11.5 | 460 |
| 117 | 65 | — | 35 | 3 | 2 | 45 | 48 | 2 | 13.8 | 13.7 | 610 |
| 118 | — | 65 | 35 | 3 | 2 | 45 | 48 | 2 | 13.7 | 13.6 | 620 |
| 119 | 60 | — | 40 | 3 | 2 | 45 | 48 | 2 | 13.4 | 13.4 | 570 |
| 120 | — | 60 | 40 | 3 | 2 | 45 | 48 | 2 | 13.5 | 13.3 | 570 |
| 121 | 50 | — | 50 | 3 | 2 | 45 | 48 | 2 | 12.7 | 12.6 | 510 |
| 122 | — | 50 | 50 | 3 | 2 | 45 | 48 | 2 | 12.8 | 12.6 | 520 |
| 123 | 35 | — | 65 | 3 | 2 | 45 | 48 | 2 | 11.9 | 11.6 | 450 |
| 124 | — | 35 | 65 | 3 | 2 | 45 | 48 | 2 | 11.9 | 11.6 | 450 |

When the NiO powder and the Ni powder are used as starting powders, it is learned from Table 1 above that use of the $Y_2O_3$ powder or the $Yb_2O_3$ powder in a suitable amount brings the coefficient of thermal expansion of the sintered body (support substrate) close to the coefficient of thermal expansion of $10.8\times10^{-6}$ of the solid electrolyte. It is further learned that the electronic conductivity of the support substrate decreases with an increase in the amount of $Y_2O_3$ or $Yb_2O_3$ but an excellent electronic conductivity is obtained so far as the amount thereof lies within a range of from 35 to 65% by volume.

It is, on the other hand, learned that the sintered body of sample No. 13(comparative example) has a coefficient of thermal expansion that is considerably greater than the coefficient of thermal expansion of the solid electrolyte.

The sintered body of sample No. 14(comparative example) has a coefficient of thermal expansion that is close to the coefficient of thermal expansion of the solid electrolyte to a fair degree and exhibits a favorable electronic conductivity but permits the element to be diffused as will be described later.

When the NiO powder and the Ni powder are used as starting powders, further, it is learned from Tables 2 to 4 above that use of the $Lu_2O_3$ powder, $Tm_2O_3$ powder, $Er_2O_3$ powder, $Ho_2O_3$ powder, $Dy_2O_3$ powder, $Gd_2O_3$ powder, $Sm_2O_3$ powder and $Pr_2O_3$ powder in a suitable amount brings the coefficient of thermal expansion of the sintered body (support substrate) close to the coefficient of thermal expansion of $10.8\times10^{-6}$ of the solid electrolyte. It is further learned that the electronic conductivity of the sintered body (support substrate) decreases with an increase in the amount of the above rare-earth oxides but an excellent electronic conductivity is maintained so far as the amount thereof lies within a range of from 35 to 65% by volume.

It is further learned from Table 5 that when the $Nd_2O_3$ powder, $CeO_2$ powder, and $La_2O_3$ powder are used as the rare-earth oxides (samples Nos. 87 to 92,comparative examples), the sintered body (support substrate) exhibits excellent electronic conductivity but exhibits coefficients of thermal expansion which are very greater than the coefficient of thermal expansion of $10.8\times10^{-6}$ of the solid electrolyte.

It is learned from Table 6 that even when two or more kinds of the rare-earth oxide powders are used in combination, the coefficient of thermal expansion of the sintered body (support substrate) can be brought close to the coefficient of thermal expansion of $10.8\times10^{-6}$ of the solid electrolyte by adjusting their amounts. It is further learned that the electronic conductivity of the sintered body decreases with an increase in the amount thereof but an excellent electronic conductivity is maintained so far as the amount thereof lies within a range of from 35 to 65% by volume.

(Experiment 2)

The sample powders used in Experiment 1 were extrusion-molded in the same manner as in Experiment 1 to obtain flat molded bodies for the support substrate, which were, then, dried.

Next, a sheet for forming the fuel-electrode layer was prepared by using a slurry of a mixture of the $ZrO_2$ (YSZ) powder containing 8% by mol of $Y_2O_3$, NiO powder, organic binder (acrylic resin) and solvent (toluene). There was further prepared a sheet for the solid electrolytic layer by using a slurry of a mixture of the above YSZ powder, organic binder (acrylic resin) and toluene. These sheets were laminated one upon the other.

The laminated sheets were wound on the molded body for the support substrate in a manner that both ends thereof were spaced apart maintaining a predetermined distance (see FIG. 1), and were dried.

On the other hand, a sheet for forming the interconnect was prepared by using the $LaCrO_3$ oxide powder having an average particle size of 2 μm, organic binder (acrylic resin) and solvent (toluene). The sheet was, then, laminated on the exposed portion of the molded body for the support substrate on which the laminated sheets have been wound, thereby to obtain a laminated sheet for firing comprising the molded body for the support substrate, sheet for the fuel-electrode layer and sheet for the solid electrolytic layer.

Next, the laminated sheet for sintering was put to the processing for removing the binder and was co-fired in the atmosphere at 1500° C.

The obtained sintered body was immersed in a paste comprising an $La_{0.6}Sr_{0.4}Co_{0.2}Fe_{0.8}O_3$ powder having an average particle size of 2 μm and a solvent (normal paraffin) to form a coating layer for oxygen-electrode on the surface of the solid electrolytic layer that has been sintered. At the same time, the above paste was applied onto the outer surface of the interconnect that has been sintered to thereby form a coating layer for the P-type semiconductor followed by firing at 1150° C. to produce a fuel cell unit as shown in FIG. 1 (sample Nos. 125 to 248).

In the thus produced fuel cells, the flat portion A of the support substrate possessed a length of 26 mm, the arcuate portions B possessed a length of 3.5 mm, the fuel-electrode layer possessed a thickness of 10 μm, the solid electrolytic layer possessed a thickness of 40 μm, the oxygen-electrode possessed a thickness of 50 μm, the interconnect possessed a thickness of 50 μm and the P-type semiconductor layer possessed a thickness of 50 μm.

The fuel cells corresponding to the above samples Nos. 13 and 14 of comparative examples are the samples Nos. 137 and 138.

Sectional surfaces of the solid electrolytic layers of the obtained fuel cells were analyzed by EPMA to confirm elements that have diffused from the support substrates. Further, a hydrogen gas was supplied into the gas passages of the support substrates, and the air was supplied to the outer side of the fuel cells (to the outer surfaces of the oxygen-electrodes) to generate electricity at 850° C. for 100 hours. The fuel cell units were then cooled and were immersed in water while pressurizing the interiors thereof to observe the leakage of gas, cracks in the fuel-electrode layers and peeling of the solid electrolytic layers from the fuel-electrode layers.

Further, the generating performance per a fuel cell was measured at 850° C. after 100 hours have passed. The results were as shown in Tables 7 to 12.

TABLE 7

| Sample No. | Sample No. in Table 1 | Diffusion into solid electrolyte | Cracks and peeling | Generating performance W/cm² |
| --- | --- | --- | --- | --- |
| 125 | 1 | no | no | 0.45 |
| 126 | 2 | no | no | 0.41 |
| 127 | 3 | no | no | 0.39 |
| 128 | 4 | no | no | 0.42 |
| 129 | 5 | no | no | 0.37 |
| 130 | 6 | no | no | 0.40 |
| 131 | 7 | no | no | 0.37 |
| 132 | 8 | no | no | 0.36 |
| 133 | 9 | no | no | 0.37 |
| 134 | 10 | no | no | 0.35 |

TABLE 7-continued

| Sample No. | Sample No. in Table 1 | Diffusion into solid electrolyte | Cracks and peeling | Generating performance W/cm² |
|---|---|---|---|---|
| 135 | 11 | no | no | 0.38 |
| 136 | 12 | no | no | 0.37 |
| *137 | *13 | no | yes | 0.25 |
| *138 | *14 | yes Al,Mg | no | 0.19 |

*outside the scope of the invention

TABLE 8

| Sample No. | Sample No. in Table 2 | Diffusion into solid electrolyte | Cracks and peeling | Generating performance W/cm² |
|---|---|---|---|---|
| 139 | 15 | no | no | 0.45 |
| 140 | 16 | no | no | 0.42 |
| 141 | 17 | no | no | 0.40 |
| 142 | 18 | no | no | 0.38 |
| 143 | 19 | no | no | 0.39 |
| 144 | 20 | no | no | 0.39 |
| 145 | 21 | no | no | 0.36 |
| 146 | 22 | no | no | 0.36 |
| 147 | 23 | no | no | 0.40 |
| 148 | 24 | no | no | 0.44 |
| 149 | 25 | no | no | 0.43 |
| 150 | 26 | no | no | 0.43 |
| 151 | 27 | no | no | 0.42 |
| 152 | 28 | no | no | 0.39 |
| 153 | 29 | no | no | 0.40 |
| 154 | 30 | no | no | 0.36 |
| 155 | 31 | no | no | 0.36 |
| 156 | 32 | no | no | 0.39 |
| 157 | 33 | no | no | 0.44 |
| 158 | 34 | no | no | 0.45 |
| 159 | 35 | no | no | 0.41 |
| 160 | 36 | no | no | 0.42 |
| 161 | 37 | no | no | 0.39 |
| 162 | 38 | no | no | 0.39 |
| 163 | 39 | no | no | 0.36 |
| 164 | 40 | no | no | 0.36 |
| 165 | 41 | no | no | 0.41 |

TABLE 9

| Sample No. | Sample No. in Table 3 | Diffusion into solid electrolyte | Cracks and peeling | Generating performance W/cm² |
|---|---|---|---|---|
| 166 | 42 | no | no | 0.45 |
| 167 | 43 | no | no | 0.44 |
| 168 | 44 | no | no | 0.42 |
| 169 | 45 | no | no | 0.42 |
| 170 | 46 | no | no | 0.39 |
| 171 | 47 | no | no | 0.38 |
| 172 | 48 | no | no | 0.35 |
| 173 | 49 | no | no | 0.35 |
| 174 | 50 | no | no | 0.40 |
| 175 | 51 | no | no | 0.44 |
| 176 | 52 | no | no | 0.44 |
| 177 | 53 | no | no | 0.41 |
| 178 | 54 | no | no | 0.42 |
| 179 | 55 | no | no | 0.38 |
| 180 | 56 | no | no | 0.39 |
| 181 | 57 | no | no | 0.36 |
| 182 | 58 | no | no | 0.36 |
| 183 | 59 | no | no | 0.39 |
| 184 | 60 | no | no | 0.45 |
| 185 | 61 | no | no | 0.44 |
| 186 | 62 | no | no | 0.42 |
| 187 | 63 | no | no | 0.42 |
| 188 | 64 | no | no | 0.38 |
| 189 | 65 | no | no | 0.38 |
| 190 | 66 | no | no | 0.36 |
| 191 | 67 | no | no | 0.35 |
| 192 | 68 | no | no | 0.41 |

TABLE 10

| Sample No. | Sample No. in Table 4 | Diffusion into solid electrolyte | Cracks and peeling | Generating performance W/cm² |
|---|---|---|---|---|
| 193 | 69 | no | no | 0.45 |
| 194 | 70 | no | no | 0.45 |
| 195 | 71 | no | no | 0.42 |
| 196 | 72 | no | no | 0.42 |
| 197 | 73 | no | no | 0.38 |
| 198 | 74 | no | no | 0.38 |
| 199 | 75 | no | no | 0.35 |
| 200 | 76 | no | no | 0.35 |
| 201 | 77 | no | no | 0.39 |
| 202 | 78 | no | no | 0.44 |
| 203 | 79 | no | no | 0.44 |
| 204 | 80 | no | no | 0.42 |
| 205 | 81 | no | no | 0.42 |
| 206 | 82 | no | no | 0.39 |
| 207 | 83 | no | no | 0.39 |
| 208 | 84 | no | no | 0.35 |
| 209 | 85 | no | no | 0.35 |
| 210 | 86 | no | no | 0.40 |

TABLE 11

| Sample No. | Sample No. in Table 5 | Diffusion into solid electrolyte | Cracks and peeling | Generating performance W/cm² |
|---|---|---|---|---|
| *211 | *87 | no | yes | — |
| *212 | *88 | no | yes | — |
| *213 | *89 | no | yes | — |
| *214 | *90 | no | yes | — |
| *215 | *91 | no | yes | — |
| *216 | *92 | no | yes | — |

*outside the scope of the invention

TABLE 12

| Sample No. | Sample No. in Table 6 | Diffusion into solid electrolyte | Cracks and peeling | Generating performance W/cm² |
|---|---|---|---|---|
| 217 | 93 | no | no | 0.45 |
| 218 | 94 | no | no | 0.45 |
| 219 | 95 | no | no | 0.42 |
| 220 | 96 | no | no | 0.41 |
| 221 | 97 | no | no | 0.39 |
| 222 | 98 | no | no | 0.40 |
| 223 | 99 | no | no | 0.36 |
| 224 | 100 | no | no | 0.36 |
| 225 | 101 | no | no | 0.45 |
| 226 | 102 | no | no | 0.44 |
| 227 | 103 | no | no | 0.42 |
| 228 | 104 | no | no | 0.42 |
| 229 | 105 | no | no | 0.40 |
| 230 | 106 | no | no | 0.39 |
| 231 | 107 | no | no | 0.36 |
| 232 | 108 | no | no | 0.35 |
| 233 | 109 | no | no | 0.44 |
| 234 | 110 | no | no | 0.45 |
| 235 | 111 | no | no | 0.42 |

TABLE 12-continued

| Sample No. | Sample No. in Table 6 | Diffusion into solid electrolyte | Cracks and peeling | Generating performance W/cm² |
|---|---|---|---|---|
| 236 | 112 | no | no | 0.41 |
| 237 | 113 | no | no | 0.38 |
| 238 | 114 | no | no | 0.39 |
| 239 | 115 | no | no | 0.35 |
| 240 | 116 | no | no | 0.35 |
| 241 | 117 | no | no | 0.44 |
| 242 | 118 | no | no | 0.45 |
| 243 | 119 | no | no | 0.42 |
| 244 | 120 | no | no | 0.41 |
| 245 | 121 | no | no | 0.39 |
| 246 | 122 | no | no | 0.40 |
| 247 | 123 | no | no | 0.35 |
| 248 | 124 | no | no | 0.35 |

In the fuel cell samples Nos. 125 to 136 and 139 to 210 as will be understood from the results of Tables 7 to 12, there were observed no cracks in the fuel-electrode layers and no peeling of the solid electrolytic layers from the fuel-electrode layers. Further, no elements diffused, and the generating performance was as good as not smaller than 0.35 W/cm².

In the samples Nos. 125 to 136 and 139 to 210, on the other hand, the differences in the coefficient of thermal expansion were relatively small between the support substrate and the solid electrolytic layer, and there were observed no cracks in the fuel-electrode layers or the peeling of the solid electrolytic layers from the fuel-electrode layers. From the standpoint of long-term reliability, however, it is desired that the amount of the particular rare-earth oxide in the support substrate is better large in a range in which it does not impair the electronic conductivity of the support substrate and is, desirably, from 35 to 65% by volume and, particularly, from 40 to 65% by volume.

In the sample No. 137 of comparative example, no diffusion was observed but the difference in the coefficient of thermal expansion was so great between the support substrate and the solid electrolytic layer that cracks occurred in the fuel-electrode layer.

In the sample No. 138 of comparative example, there were observed no cracks in the fuel-electrode layer and no peeling of the solid electrolytic layer from the fuel-electrode layer. However, diffusion of Mg and Al was seen in the solid electrolytic layer, and the generating performance after the power generation of 100 hours was as low as 0.19 W/cm².

From the results of Table 11, further, no diffusion was seen in the samples Nos. 211 to 216 that were comparative examples. However, differences in the coefficient of thermal expansion were so great between the support substrate and the solid electrolytic layer that cracks occurred in the fuel-electrode layer.

It is learned from Table 12 that even in the samples Nos. 217 to 248 (present invention) using the composite rare-earth oxides as rare earth powders, the coefficients of thermal expansion of the support substrates can be brought close to the coefficient of thermal expansion of $10.8 \times 10^{-6}$ of the solid electrolyte by adjusting the amounts of the composite rare-earth oxides, making it possible to suppress the occurrence of cracks in the fuel-electrode layers. Because of the same reason, further, there is observed no peeling of the solid electrolyte from the fuel-electrode layer.

The invention claimed is:

1. A fuel cell comprising:
a gas-permeable and electrically conducting support substrate having a fuel gas passage formed therein;
a fuel-electrode layer formed on said support substrate;
a solid electrolytic layer formed on said fuel-electrode layer so as to cover said fuel-electrode layer and containing $ZrO_2$ in which rare earth elements are existing in the form of solid solutions; and
an oxygen-electrode provided on the solid electrolytic layer so as to face said fuel-electrode layer;
wherein said support substrate is formed of a material consisting essentially of a metal of the iron family and/or an oxide of a metal of the iron family, and an oxide of at least one rare-earth element, and wherein said rare-earth element is selected from the group consisting of Y, Lu, Yb, Tm, Er, Ho, Dy, Gd, Sm and Pr, and said oxide of said rare-earth element is contained in said material of the support substrate in an amount of from 35 to 65% by volume.

2. A fuel cell according to claim 1, wherein said metal of the iron group is Ni.

3. A fuel cell according to claim 1, wherein said oxide of said rare-earth element consists of $Y_2O_3$ and/or $Yb_2O_3$.

4. A fuel cell according to claim 1, wherein said fuel-electrode layer contains $ZrO_2$ in which Ni and/or NiO as well as rare earth elements are existing in the form of solid solutions.

5. A fuel cell according to claim 1, wherein said oxygen-electrode is positioned on the surface of said support substrate on one side thereof, an interconnect is provided on the surface of said support substrate on the other side thereof, and the fuel-electrode layer and the solid electrolytic layer are turning round up to both end portions of said interconnect.

6. A fuel cell according to claim 1, wherein said oxygen-electrode is formed of porous electrically conducting ceramics composed of a perovskite oxide.

7. A fuel cell according to claim 6, wherein said perovskite oxide possesses La on the A-site.

8. A fuel cell assembly obtained by containing, in a container, a cell stack of a structure in which a plurality of fuel cell of claim 1 are connected together in series via a collector member.

* * * * *